United States Patent

Wagner

Patent Number: 5,195,395
Date of Patent: Mar. 23, 1993

[54] CRANK MECHANISM FOR A LIFT-SLIDE COVER OF A MOTOR VEHICLE

[76] Inventor: Norbert Wagner, Philipp-Reis-Strasse 22A, D-6050 Offenbach, Fed. Rep. of Germany

[21] Appl. No.: 847,866
[22] PCT Filed: Jul. 19, 1989
[86] PCT No.: PCT/DE89/00481
§ 371 Date: Mar. 23, 1990
§ 102(e) Date: Mar. 23, 1990
[87] PCT Pub. No.: WO90/00987
PCT Pub. Date: Feb. 8, 1990

Related U.S. Application Data

[63] Continuation of Ser. No. 466,296, Mar. 23, 1990, abandoned.

[30] Foreign Application Priority Data

Jul. 26, 1988 [DE] Fed. Rep. of Germany ....... 3825269

[51] Int. Cl.⁵ ........................... B62D 1/06; B60J 7/057
[52] U.S. Cl. ........................................ 74/557; 296/223;
[58] Field of Search ............................ 74/557, 810, 804; 296/223

[56] References Cited

U.S. PATENT DOCUMENTS

| | | | |
|---|---|---|---|
| 4,023,858 | 5/1977 | Bienert et al. | 74/557 X |
| 4,162,805 | 7/1979 | Hirschberger | 74/557 X |
| 4,222,602 | 9/1980 | Kouth | 296/223 |
| 4,651,594 | 3/1987 | Vogel et al. | 74/557 X |
| 4,841,812 | 6/1989 | Fuerst et al. | 74/810 |

FOREIGN PATENT DOCUMENTS

| | | |
|---|---|---|
| 2333666 | 2/1975 | Fed. Rep. of Germany . |
| 2426765 | 12/1975 | Fed. Rep. of Germany . |
| 2447190 | 4/1976 | Fed. Rep. of Germany . |
| 2135803 | 8/1977 | Fed. Rep. of Germany ........ 74/557 |
| 2657850 | 8/1978 | Fed. Rep. of Germany ........ 74/557 |
| 3200289 | 7/1983 | Fed. Rep. of Germany ........ 74/557 |
| 3308823A1 | 9/1984 | Fed. Rep. of Germany . |
| 2272856 | 12/1975 | France ................................. 74/557 |
| 2151698 | 7/1985 | United Kingdom .................. 74/557 |

OTHER PUBLICATIONS

Partial Translation of West German O.S. No. 3,200,289; IPC.

*Primary Examiner*—Vinh T. Luong
*Attorney, Agent, or Firm*—Koda and Androlia

[57] ABSTRACT

A crank mechanism for a lift-slide cover of a motor vehicle having a crank arm with which a shaft can be rotated which is connected with a drive for a lift-slide mechanism of the lift-slide cover. The crank arm is pivotable relative to the shaft. By swiveling the crank arm a sliding piece is slid perpendicularly to a locking pin disposed parallel to the shaft and lifts this locking pin against the force of the spring. Since the sliding piece and the locking pin have oblique surfaces, the locking pin engages into the sliding piece after lifting.

15 Claims, 5 Drawing Sheets

CRANK MECHANISM FOR A LIFT-SLIDE COVER OF A MOTOR VEHICLE

This is a continuation of application Ser. No. 466,296, filed Mar. 23, 1990, abandoned.

BACKGROUND OF THE INVENTION

Field of Invention

The invention relates to a crank mechanism for lift-slide covers disposed in the ceiling of motor vehicles.

Lift-slide covers disposed in the ceiling of motor vehicles are as a rule operated with hand cranks. It should therein be possible to carry out at least two functions with these hand cranks: the lifting of the cover about a given angle relative to an axis extending parallel to the to the ceiling of the motor vehicle as well as the sliding of the cover parallel to the motor vehicle cover. After completion of the particular function the hand crank often is in addition to be foldable into a sunken recess so that the interior side of the cover of the motor vehicle has no protruding edges. This folding-in moreover should, in addition, also be possible from each final position of the hand crank which means an additional difficulty because the crank arm can often only be folded into the sunken recess if it is in a particular position. Whether the lift-slide cover is to be lifted or slid with the hand crank can for example be decided by reversal of the direction of rotation. The cranking in the clockwise direction causes therein for example the lifting of the cover while the cranking in the counterclockwise direction effects the sliding of the cover. It is of importance in this case that a zero position between both directions of rotation is defined.

A crank drive for lift-slide roofs of motor vehicles is already known in which a crank arm is swivelled about its swivel axis into a particular position and its end extended beyond the swivel axis comes into contact with a hook at the lower end of the pin whereby this pin is pulled in the downward direction against the effect of a spring (DE-OS 24 26 765). Through the motion of the pin an outer toothing is brought out of engagement with an inner toothing at a drive pinion so that the crank arm together with a sleeve and the pin is rotatable into a position from which it can be swivelled into a sunken recess. Through the swivelling of the crank arm it is consequently no longer possible to swivel the lift-slide roof. However, in the case of this known crank drive it is of disadvantage that the crank arm before the swivel motion must first be brought from its operation position into a position which is directed counter to the later swivel motion.

Hereby the crank arm assumes three quasi-stable positions which with respect to its operation is awkward.

A similar manually operated crank and drive mechanism for a lift-slide cover with which it is possible to fold the crank arm with a multiplicity of positions of displacement of the cover into a sunken recess is known from DE-P 24 42 7190. Herein all functions for the actuation of the slide cover, specifically the sliding as well as also the setting as well as also the releasing of the latching in the closure position for enabling the setting motion can be carried out with a single actuation member specifically the crank arm. It is herein of disadvantage that the crank arm must be latched in three different positions. A first position is required when lifting the cover, a second during normal sliding of the cover, and a third in the folded-in position.

Further, a device is known for limiting the number of rotations of a shaft for rotatable drives of sliding roof drives in motor vehicles in which for two different motion progressions which can be brought about with the same shaft for optional sliding or setting when swivelling in the slide cover in spite of the setting paths which are of different length for the two motions and which are to be limited by means of the device only one shift position is provided to simplify the operation of the slide roof equipped with two shift functions (DE-P 23 33 666). Herein is slidably disposed parallel to the shaft a locking pin which permits in its shifted-in final position both directions of rotation of the drive and in its disengaged position blocks the drive in both directions. Herein is of disadvantage that the hand crank first must be brought out of its resting position with thumb and index finger. Subsequently either a second hand or the thumb of the first hand must be used for depressing a push button. Therein the index finger alone must initiate the rotation of the hand crank before it is possible to continue rotating with thumb and index finger. This is unsatisfactory from the aspect of ease of operation and safety. In the final positions the hand crank is in an oblique position and cannot be folded in. Moreover, the final stroke in the final position is not defined.

Furthermore, a slide roof is known in which a crank gear mechanism is locked in the zero position of a slide cover, thus in the closure position, through a stud engaging a disk of the crank gear mechanism which is disengaged by a dog [plate] of at least one predetermined folding position of the crank (DE-A-3 200 289). Since the locking pin is driven via a gear reduction and does not directly position the crank, and because furthermore the crank is disengaged from the gear mechanism, it is not possible to again fold in immediately the blocked crank which is again just located over the cavity.

Lastly, a hand crank apparatus for slide or lift roofs is also known with which it is possible to dispense with the actuation of a push button for latching of a once-set positioning-out height of the slide-lift roof (DE-OS 33 08 823). In this hand crank drive form-fitting engagement means are coaxially assigned to a hand crank and an input toothed wheel of a gear mechanism wherein these engagement means can be temporarily brought out of engagement against a spring load. As form-fitting engagement means are provided projections and depressions in a raster-head and a raster-plate lying one above the other. Of disadvantage in this known hand crank drive is, however, that the hand crank must be rotated and simultaneously together with a hub must be pressed upward by a particular displacement path against the load of a plate spring.

SUMMARY OF THE INVENTION

The invention is therefore based on the task of creating a crank mechanism according to the preamble of Patent Claim 1 which makes it possible without actuating an additional push button to rotate the hand crank toward the right or the left.

The advantage achieved with the invention comprises in particular in that the hand crank can be latched in any given position relative to the motor vehicle roof by means of a locking pin. If the hand crank is folded down it is possible to rotate immediately in the clockwise or counterclockwise direction whereby an immediate lifting or sliding of the cover is made possible. In addition, the final position is defined and the destruction of the annular gear of the crank mechanism gear system is virtually impossible. Furthermore, it is possible to provide on the underside of the mechanism a covering cap whereby a labeling field is generated and screws and pins are covered.

BRIEF DESCRIPTION OF THE DRAWINGS

An embodiment example of the invention is represented in the drawing and will be described below in greater detail. Therein show.

DETAILED DESCRIPTION OF THE INVENTION

Figure 1:
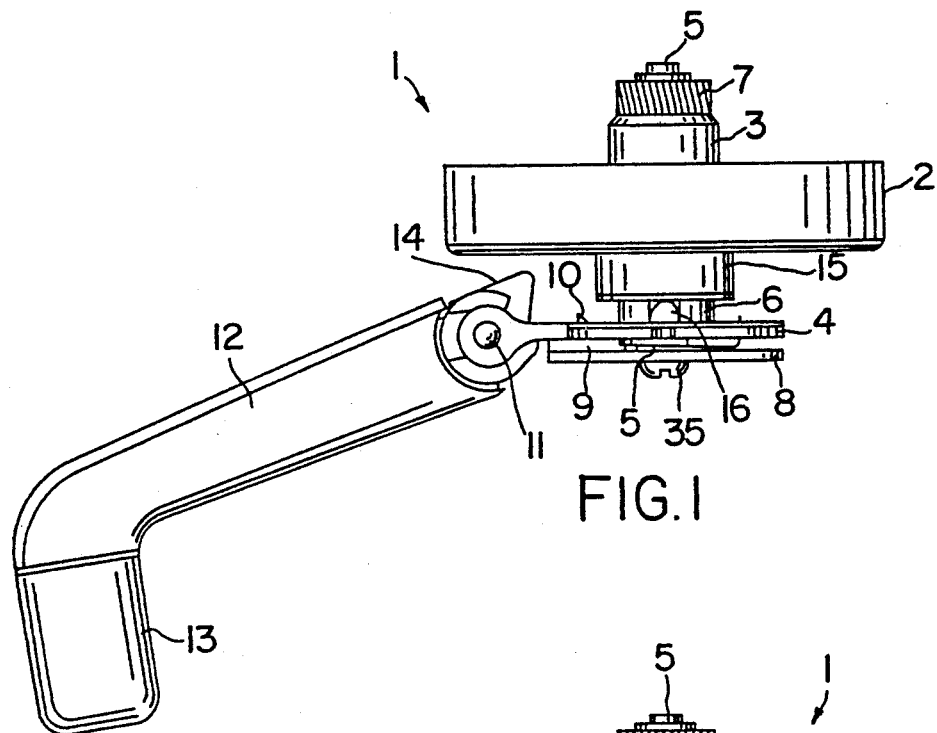
FIG. 1—a crank mechanism in side view wherein the hand crank assumes a first position relative to an anchor plate of the crank drive mechanism.

In FIG. 1 is represented a crank mechanism 1 for the operation of a lift-slide cover 74 in a motor vehicle. This crank mechanism 1 has an anchor plate 2, a shaft 3 rotatable jointly with this anchor plate 2, a shaft 5 fixedly connected with a flange 4, a substructure 6 fixedly seated on the shaft 5, and a toothed gear 7 likewise fixedly connected with the shaft 5. To this crank mechanism belong additionally also a lower plate 8, disposed at a distance from this flange 4, and having essentially the same contours as it. Plate 8 and flange 4 always have the same spatial position one to the other since they are both fixedly connected with shaft 5. Between the plate 8 and the flange 4 are disposed a sliding piece 9 which can be slid against the force of a spring in the direction toward the shaft 5 and which contains a cap 10 with triangular cross section which can be brought into contact with an element to be displaced.

With the flange 4 via an axle 11 a crank arm 12 is connected to a crank piece 13 which can assume two settings of which the one setting is shown in FIG. 1. In this final position shown in FIG. 1 a displacement part 14 is out of contact with the sliding piece 9 which it is to displace. The anchor plate 2 is disposed stationary relative to the ceiling 72 of a motor vehicle so that with a rotation of the crank arm 12 relative to this anchor plate 2 the plate 8, a rotation of the crank arm 12 relative to this anchor plate 2 the plate 8, the flange 4, the sliding piece 9, the toothed gear 7, the substructure 6, and the shaft 5 rotate while together with the shaft 3 the anchor plate 2, which has additionally a projection 15 directed in the downward direction, does not change its position.

Figure 2:
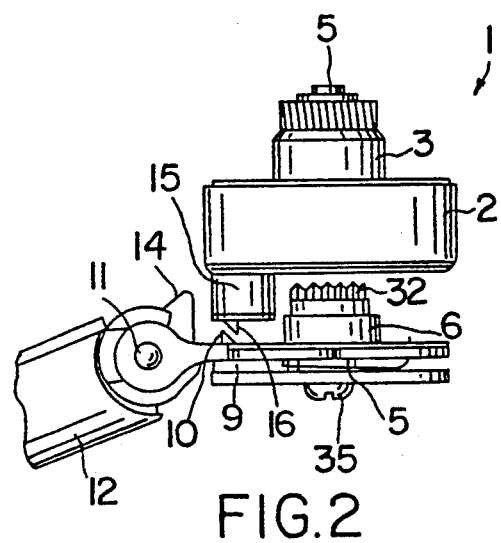
FIG. 2—the crank mechanism according to FIG. 1 wherein, however, the hand crank assumes a position rotated about 90° relative to the anchor plate.

For sliding a locking pin 34 not visible in FIG. 1, on the projection 15 is provided a ramp 16 which must be brought into contact with the cap 10 but in FIG. 1 is not in contact with this cap 10 because the crank arm 12 is not in the proper position to the anchor plate 2. If the crank arm 12 is rotated about 90° relative to the anchor plate 2, the position shown in FIG. 2 results. In the representation of FIG. 2, however, the position of the crank arm 12 is maintained while the position of the anchor plate 2 compared to the representation of FIG. 1 is rotated by 90°. Hereby the structural elements important for the invention are more clearly recognizable.

These structural elements are the sliding piece 9, the cap 10, the projection 15, and the ramp 16. The cap 10 now lies directly opposite the ramp 16 so that with a motion of the cap 10 toward the right a force is exerted on the ramp 16, and the latter would due to its oblique surface need to absorb a vertical force component which could move the ramp 16 in the upward direction. In FIG. 2 can be seen above the substructure 6 the toothing 32.

Figure 3:
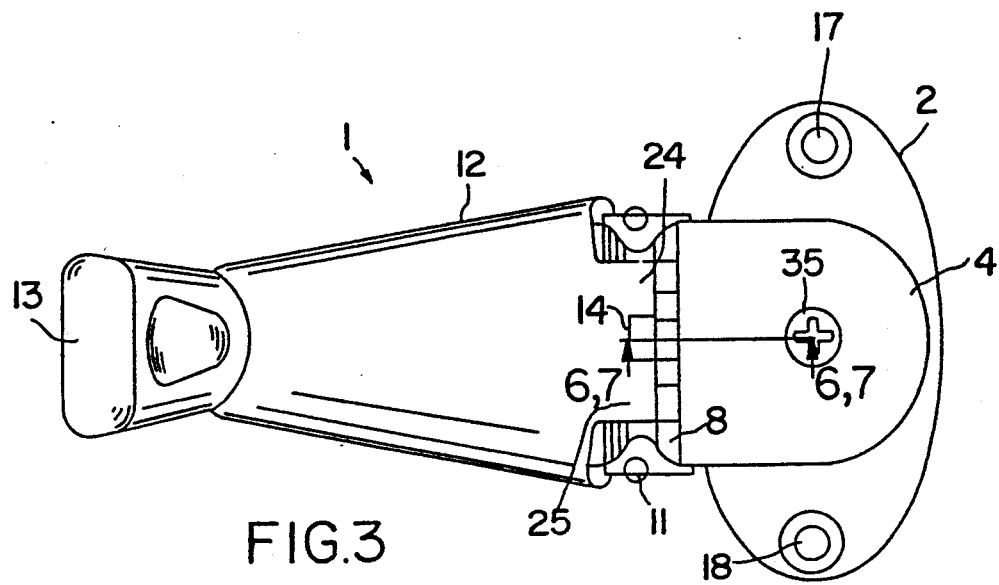
FIG. 3—a projection view of the underside of the crank mechanism according to FIG. 2.

FIG. 3 shows crank mechanism 1 in a view from below. This is the view which the motor vehicle driver has if he looks toward the ceiling of his motor vehicle. It can be seen that the anchor plate 2 has two bores 17, 18 through which can be placed the screws for fastening the anchor plate 2 to the motor vehicle ceiling. The crank arm 12 is shown broken open at its one end so that the axle 11 can be seen. In addition the underside of the displacement part 14 can be seen which is disposed between two stays 24, 25 of the crank arm 12. Analogously plate 8 and flange 4 are visible wherein the flange 4 is connected by means of a screw 35 with the shaft 5.

Figure 4:
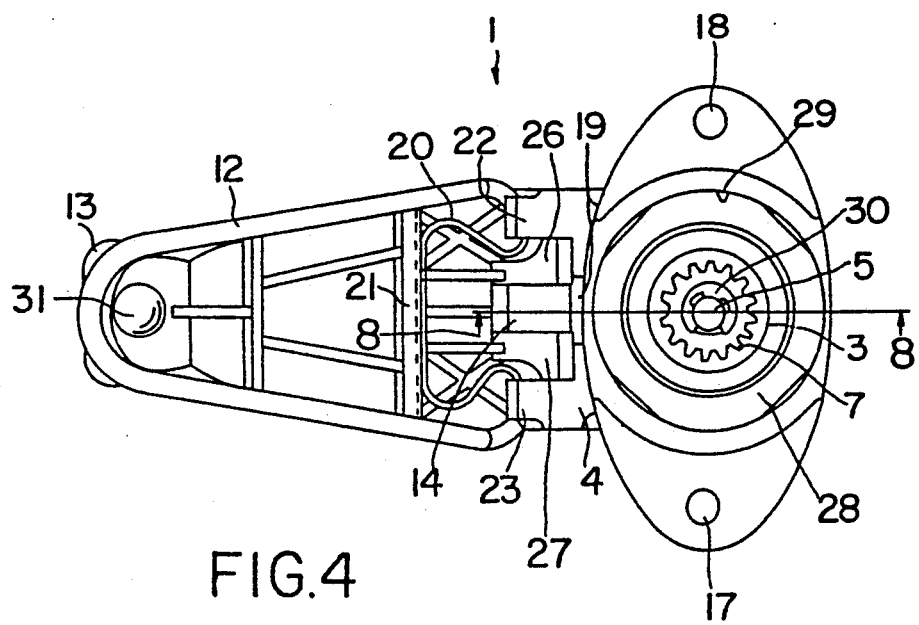
FIG. 4—a plan view onto the upper side of the crank mechanism according to FIG. 2.

FIG. 4 shows the same crank mechanism 1 as in FIG. 3, however in a view onto the upper side facing the motor vehicle ceiling 72 wherein the crank arm 12 is folded away from this motor vehicle ceiling. Hereby a gap 19 between the displacement part 14 and the anchor plate 2 is formed.

The spring 20 can be seen which essentially has the form of an omega whose upper part is braced against a cross bracing 21 of the crank arm 12 while the lower ends are introduced into bearings 22, 23 which are fixedly connected with plate 4 and in which rests also the axle 11. Due to this spring 20 the crank arm 12 can assume two stable positions: one lower position represented in FIGS. 1 and 4 and limited through the limit stop of crank arm 12 with its projections 24, 25 to plate 4 and one upper position shown in FIGS. 3 and 5 defined by the displacement part 14 and by limit stop parts 26, 27. A disk 28 with eccentric circumference and a notch 29 in this circumference surrounds the shaft 3 carrying the toothed gear 7 which is connected with a retaining ring 30 with shaft 5. By 31 is denoted a rivet head whose rivet connects rotatably the crank piece 13 with the crank arm 12.

Figure 5:
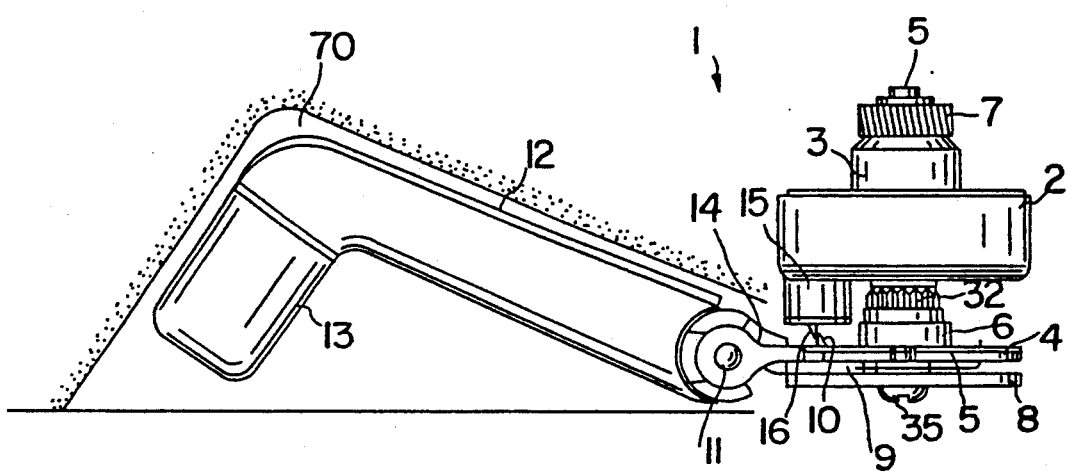
FIG. 5—a side view of the crank mechanism according to FIG. 2 wherein however the crank arm is folded upward.

FIG. 5 shows a view of the crank mechanism 1 which essentially agrees with the view of FIG. 2 wherein however the crank arm 12 is folded upward. It can be seen herein that the ramp 16 is now located to the left of the cap 10. By lifting the crank arm 12 the displacement part 14 was pressed against the edge of the sliding piece 9 which hereupon moved between the two plates 4, 8 toward the right, slid with its oblique surface of the cap 10 the ramp 16 against a spring force in the upward direction, and subsequently appeared on the rearward side of this ramp 16 so that the latter moved again downward. Since now the two non-oblique surfaces of cap 10 and ramp 16 oppose each other, the ramp 16 can no longer be pushed upward. A recess 70 which is located in the roof of a motor vehicle is shown schematically in FIG. 5.

Figure 6:
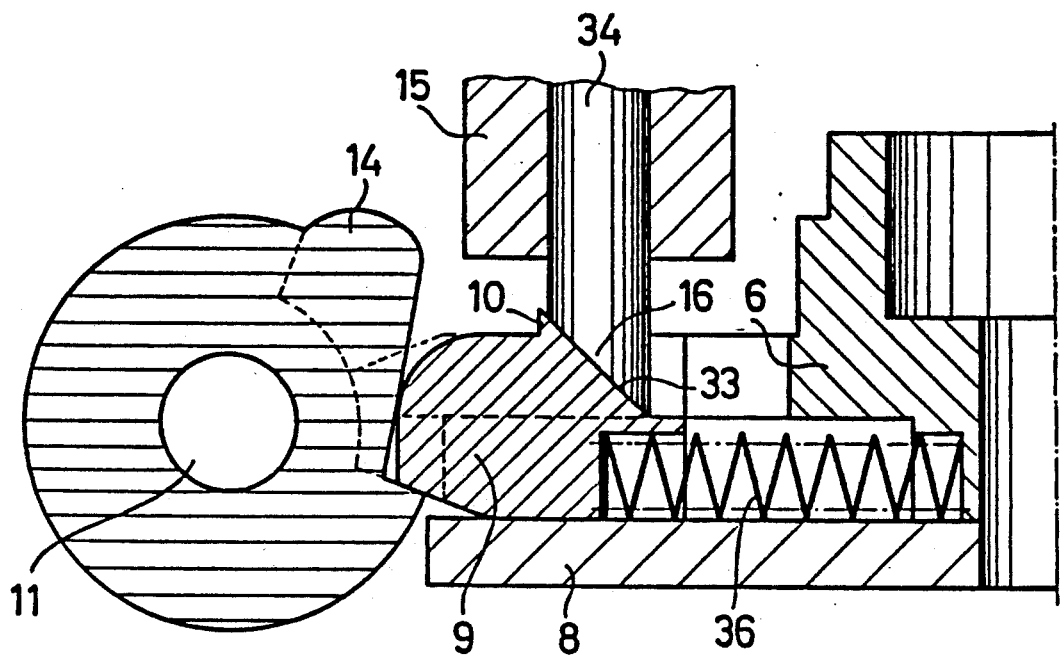
FIG. 6—a detailed partial cross-sectional representation of an device for sliding a locking pin along the line 6—6 in FIG. 3 wherein the device is in a first position.
Figure 7:
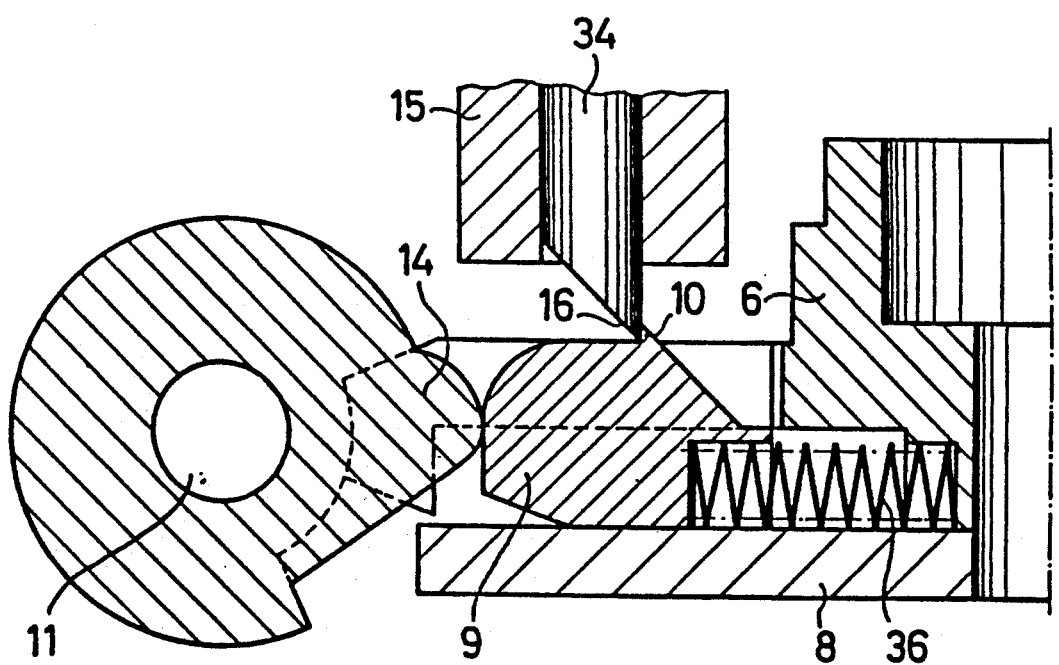
FIG. 7—a detailed partial cross-sectional representation along the line 7—7 in FIG. 3 as in FIG. 6, wherein however the device for sliding the locking pin is in a second position.

The details during the lifting-upward of ramp 16 and consequently of the locking pin connected with ramp 16 are shown in FIGS. 6 and 7.

In FIG. 6 it can be seen how through the pressure of the displacement part 14 onto the sliding piece 9 of cap 10 representing the extension of an oblique surface 33 of the sliding piece 9, ramp 16 and consequently the locking pin 34 are lifted upward. The pressure herein takes place against t the force of a spring 36 disposed between the substructure 6 and the sliding part 9.

FIG. 7 shows the condition in which locking pin 34 is lifted upward and locked against sliding backwards. The backward locking results thereby that only the two non-oblique rearward flanks of cap 10 and ramp 16 oppose each other.

Figure 8:
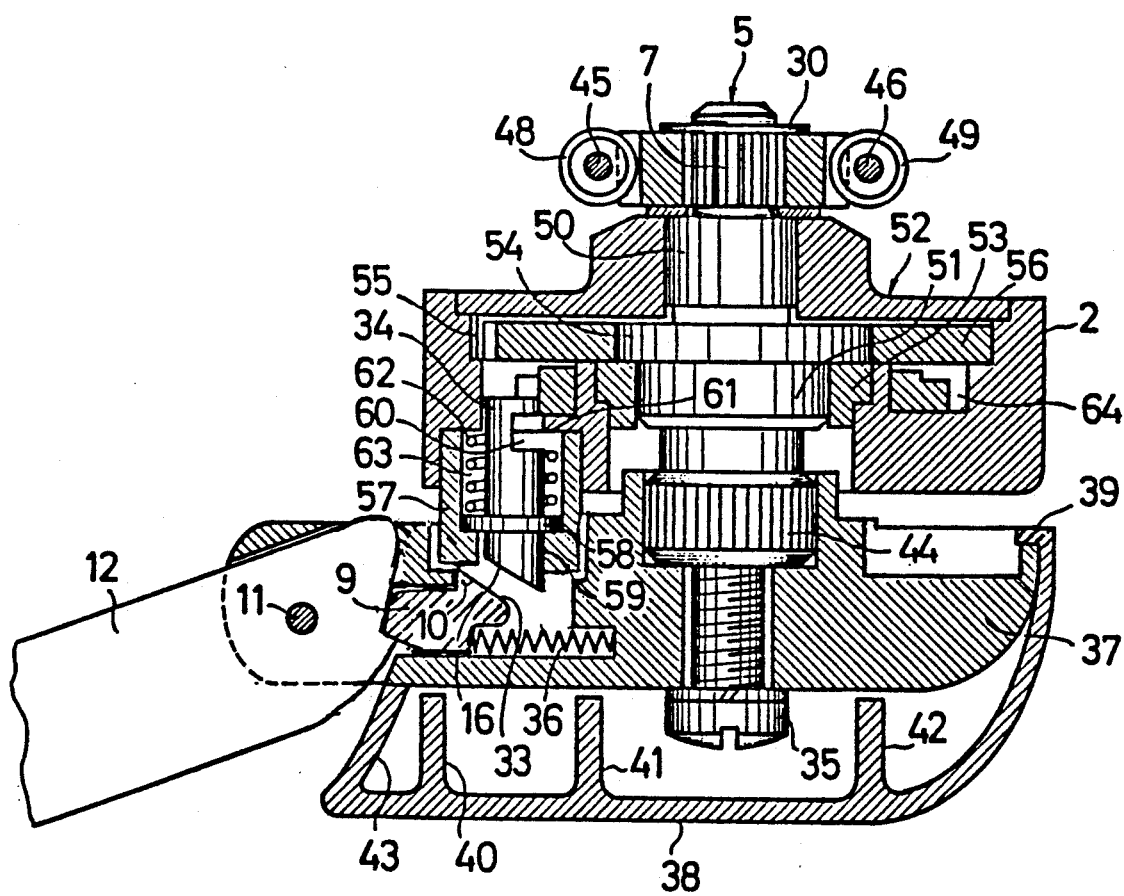
FIG. 8—a representation in cross section of a crank mechanism of a second embodiment of the present invention in which the locking device as well as also the crank drive proper can be seen.

In FIG. 8 is represented in a partial section a variant of the device described in the preceding Figures which simultaneously also shows details of the drive mechanism known per se. In this variant a uniform block 37 is provided which carries the sliding piece 9 and the spring 36. This block 37 furthermore is closed off downwardly with a cap 38 which engages with a nose 39 into a notch of the block 37 and which has several spacers 40, 41, 42. Between the spacers 41 and 42 is located the screw head 35. The cap 38 hence covers this screw head and forms a field for a potential label. An end face 43 can be realized in its upper area so that it likewise engages into block 37.

Figure 9:
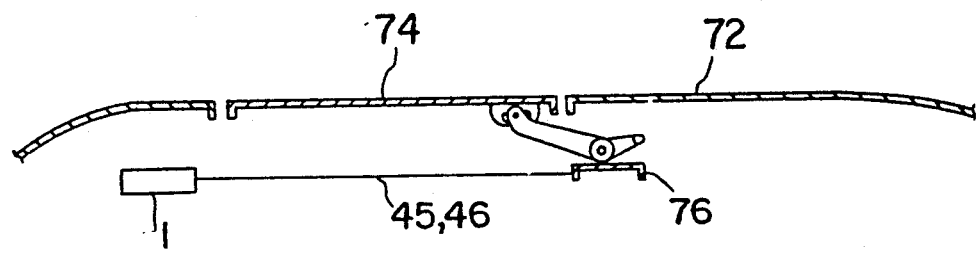
FIG. 9—is a simplified view illustrating the installation of the crank mechanism in the roof of an automobile.

The shaft 5 is provided on the one side with a serrated head 44 and on the other side with the drive gear 7 which drives two wires 45, 46 which have spiral worm tops 48, 49 and form so-called thread cables. The wire 45 is hereby always moved in the direction opposite to wire 46. Wires 45, 46 are connected with lift 74 and slide mechanisms 76 already known and therefore not described in further detail; however, the general placement and use of these elements together with the roof 72 is shown in simplified form in FIG. 9.

The operating crank with corresponding counter toothing placed on the serrated head 44 is composed of the block 37 functioning as crank foot and the crank arm 12. The block 37 and the crank arm 12 are articulated with each other by means of axle 11. The shaft 5 led through the anchor plate body 2 is rotatably supported with areas 50 and 51 on a bearing cover 52 or a bearing ring 53 set into the anchor plate body 2, respectively.

The bearing cover 52 is set into the anchor plate body 2 and fastened for example at its circumference by caulking. The axial fixing of the drive toothed gear 7 is assumed by the retaining ring 30. A cam plate 54 fastened rigidly at shaft 5 supports the annular gear 56 provided with external toothing whose toothing engages the internal toothing in the anchor plate body 2. The external toothing can for example have 34 teeth while the internal toothing has 36 teeth.

The operating mechanism of the device represented in FIG. 8 is as follows: With the rotation of shaft 5 by means of the crank arm 12 in the one or the other direction and the part connected to it torsion-tight the cam plate moves the annular gear 56 which therein rolls with its external toothing 55 off the stationary internal toothing of the anchor plate 2. Since the number of teeth differs by two teeth the relative position between the annular gear 56 and the internal toothing after completion of one rotation of shaft 5 is shifted by the measure of two tooth divisions in the direction of the circumference. The annular gear 56 therein rotates oppositely to the direction of rotation of shaft 5, however with an angular speed decreased by orders of magnitude. It can therefore be seen that the application of limit stops at the annular gear 56 and the assignment of stationary limit stops must lead after precisely definable numbers of rotation of shaft 5 to the blocking of shaft 5 and consequently limitation of rotation, i.e. path limitation of the parts driven over via the toothed gear 7.

In the following the limit stop means which, on the one hand, are disposed on the anchor plate body 2 and, on the other hand, on the annular gear 56 will be explained in detail. The locking pin 34 guided slidably in a guidance sleeve 57 has a flange 58 through which the motion of the locking pin 34 is limited due to an annular projection 59 if the guidance sleeve 57. The end of the locking pin 34 provided with a transverse recess 60 is guided in a bore 61 in the anchor plate body 2. A helical compression spring 62 is set into the annular space between the locking pin 34 and a cylinder bore 63 and braces itself, on the one hand, on flange 58 fastened on the locking pin 34 and being unitary with it, and, on the other hand, on the anchor plate body 2. The bore 63 is carried through to an annular channel 64 concentrically surrounding the shaft 5, into which annular channel 64 the locking pin 34 projects.

Further details of the structure of the device according to FIG. 8 can be found in DE-P 23 33 666. Since they are not essential to the present invention, their description is omitted.

It is furthermore emphasized that pin 34 in the embodiment example has indeed an oblique ramp 16 but that one such is not absolutely necessary. It would also be conceivable to round off the pin or implement it otherwise at its one end so that it can be lifted upward and engages into a correspondly implemented sliding piece 9.

Moreover, the mechanism for lifting upward the pin is not limited to the application in a crank mechanism but rather it can be used wherever a pin is to be lifted upward by means of a rotary motion of an arm or the like.

I claim:

1. A crank mechanism for a lift-slide cover of a motor vehicle comprising:
a crank arm (12);
a shaft (5);
a coupling means (45, 46) for connecting said shaft (5) with a lift-slide mechanism of the lift-slide cover;
an axis of rotation (11) with respect to which the crank arm (12) is swivelable, whereby said axis of rotation (11) extends perpendicularly to the longitudinal axis of said shaft (5);
a locking pin (34) extending parallel to the longitudinal axis of the shaft and being displaceable along its longitudinal axis whereby the locking pin (34) in a first position blocks the rotary motion of the crank arm (12) and in a second position releases the rotary motion of the crank arm (12);

means (20, 24, 25, 26, 27) for establishing first and second stable swiveling positions of the crank arm (12); and means (9) movable vertically with respect to said shaft (5), said means (9) moving said locking pin (34) from said first position into said second position during the swiveling of said crank arm (12) from said first stable swiveling position into said second stable swiveling position.

2. Crank mechanism as stated in claim 1 further comprising a blocking device engageable with said locking pin wherein through a swiveling of the crank arm (12) into said first stable swiveling position said blocking device is actuated which moves said locking pin to said first position which blocks the shaft (5) against rotary motions and that through swiveling of the crank arm (12) into said second stable swiveling position the blocking device is actuated to move said locking pin to said second position to release a rotary motion of the shaft (5).

3. Crank mechanism as stated in claim 2, characterized in that the blocking device contains a sliding piece (9) which moves said locking pin (34).

4. Crank mechanism as stated in claim 2 characterized in that the blocking device during swiveling of the crank arm (12) in a direction of a motor vehicle ceiling is released and when folding down the crank arm (12) is still released.

5. Crank mechanism as stated in claim 1 wherein a drive for the crank mechanism contains a device (51, 53, 54, 55) for the limitation of the number of rotations of the shaft (5).

6. Crank mechanism as stated in claim 1, wherein a cam plate (54) is fastened rigidly on the shaft (5).

7. Crank mechanism as stated in claim 6, wherein on the circumferential surface of the cam plate (54) an annular gear (56) provided with an external toothing (55) is rotatably supported.

8. Crank mechanism for a lift-slide cover of a motor vehicle comprising:
a crank arm (12);
a shaft (5) whose longitudinal axis extends essentially perpendicularly through an imaginary surface which is formed by the rotary motion of the crank arm (12);
a coupling means (45, 46) for connecting the shaft (5) with a lift-slide mechanism of the lift-slide cover;
an axis of rotation (11) with respect to which the crank arm (12) is swivelable, whereby said axis of rotation (11) extends perpendicularly to the longitudinal axis of said shaft (5);
a locking pin (34) extending parallel to the longitudinal axis of the shaft and being displaceable along its longitudinal axis, whereby the locking pin (34) in a first position blocks the rotary motion of the crank arm (12) and in a second position releases the rotary motion of the crank arm;
a flange (4) rigidly connected with the shaft (5) with said crank arm (12) pivotally fastened about said axis of rotation on said flange (4) at a distance from the shaft (5);
a projection (14) provided on said crank arm (12); and
a sliding piece (9) displaceable by contact with said projection (14) for moving the locking pin (34) from said first position to said second position by moving the crank arm (12) around its axis of rotation (11).

9. Crank mechanism as stated in claim 8 wherein on the shaft (5) and above the flange (4) a part (2) is disposed in which the shaft (5) rotates and which has an element (16) directed downwardly which when the sliding piece (9) is pushed out is disposed between the shaft (5) and said sliding piece (9) and which when the sliding piece (9) is pushed in reaches behind a holding projection (10) of said sliding piece (9).

10. Crank mechanism as stated in claim 9, wherein the part directed downwardly has an oblique surface (33) which when the sliding piece (9) is pushed out resists on an oblique surface of said sliding piece (9) so that if the sliding piece (9) is slid inward the part (16) directed downwardly is lifted upwardly until it reaches behind the holding projection (10) of the sliding piece (9).

11. Crank mechanism as stated in claim 8, further comprising another flange (8) provided below said flange (4) which has essentially the same dimensions as the flange (4) and that on said another flange (8) the sliding piece (9) is disposed.

12. Crank mechanism as stated in claim 11, wherein the two flanges (4, 8) comprise essentially a semicircular area with a rectangular piece adjoining it.

13. Crank mechanism as stated in claim 11 or 8, wherein the flange (4) has notches on its circumference.

14. Crank mechanism as stated in claim 12, characterized in that the another flange (8) is provided with a covering.

15. Crank mechanism as stated in claim 3 or 8 characterized in that the locking pin (34) slidable parallel to the shaft (5) can only at a particular position of an annular gear (56) be shifted into a path of a limit stop means connected with the annular gear (56) or disengaged from the limit stop means by spring force. 6

* * * * *